United States Patent

[11] 3,588,828

| [72] | Inventor | Joseph Schulein<br>Vancouver, Wash. |
|---|---|---|
| [21] | Appl. No. | 657,925 |
| [22] | Filed | Aug. 2, 1967 |
| [45] | Patented | June 28, 1971 |
| [73] | Assignees | H. Dutton Hayward Trustee of the Hilda Trusts 1—9 Inclusive<br>Tacoma, Wash.;<br>Joseph and Margaret A. Schulein<br>Vancouver, Wash., fractional part interest to each |

[54] SIGNALING SYSTEM RESPONSIVE TO PULSES WITHIN AN AMPLITUDE RANGE
13 Claims, 5 Drawing Figs.

[52] U.S. Cl. .................................................. 340/169,
340/167, 340/172, 328/115
[51] Int. Cl. ...................................................... H04q 5/14
[50] Field of Search ........................................... 340/169,
167, 172; 328/115

[56] References Cited
UNITED STATES PATENTS

| 2,384,167 | 9/1945 | Harrington | 340/172 |
| 2,731,623 | 1/1956 | Kendall | 340/169X |
| 3,341,816 | 9/1967 | Davis | 340/172 |
| 2,489,297 | 11/1949 | Labin | 328/115X |
| 2,535,061 | 12/1950 | Greig | 328/115 |
| 3,315,168 | 4/1967 | Cantella | 328/115X |

*Primary Examiner*—Harold I. Pitts
*Attorney*—Kolisch and Hartwell

ABSTRACT: An electrical signaling system including plural transmitters, plural remote receivers each associated with a different one of the transmitters, and a pair of conductors interconnecting all of the transmitters and receivers for transmitting signals therebetween. The transmitters are operable to produce recurrent pulses with the pulses of different transmitters having different pulse heights. Each receiver includes pulse height sensitive circuitry which is responsive only to the pulses produced by the receiver's associated transmitter.

Patented June 28, 1971

INVENTOR.
JOSEPH SCHULEIN
BY Kolisch & Hartwell
ATTORNEYS

INVENTOR.
JOSEPH SCHULEIN
BY Kolisch + Hartwell
ATTORNEYS

SIGNALING SYSTEM RESPONSIVE TO PULSES WITHIN AN AMPLITUDE RANGE

The present invention relates to an electrical signaling system, and more particularly to such a system wherein plural pairs of associated transmitters and receivers simultaneously share the use of a common transmission medium.

In such a system, obviously it is important that signals be communicated in such a manner that each receiver can readily distinguish the signals coming from its associated transmitter. In known systems of the type generally indicated, however, this result has been obtained ordinarily only through the use of complicated and expensive circuitry. For example, many systems utilize the technique of time-division multiplexing, whereby each associated transmitter and receiver periodically communicate through the common medium. This technique, however, requires the use of involved synchronizing and pulse-counting circuitry. Other systems make use of frequency differentiation to distinguish the signals of different transmitters, but this approach usually requires complicated filter circuitry.

A general object of the present invention is to provide a novel common medium electrical signaling system which permits communication between plural pairs of associated transmitters and receivers, and which takes care of the problem of signal differentiation without requiring complicated and expensive circuitry.

More particularly, an object of the invention is to provide such a system wherein the signals produced by different transmitters comprise pulses having different pulse height characteristics, and such signals are distinguished by receivers which respond only to signals having the pulse height characteristics of pulses produced by their respective associated transmitters.

According to the invention, each pulse of a given transmitter, for a preselected time interval, has a voltage level that remains within a particular voltage range which is characteristic for the transmitter. The receiver associated with the transmitter includes novel circuitry which permits the receiver to respond only to a pulse that has a voltage level remaining within such a voltage range for a certain minimum time.

Another object of the invention is to provide a novel selective receiver which responds only to a pulse having, for a preselected time interval, a voltage level remaining within a particular voltage range.

A related object is to provide such a receiver which is readily adjustable to respond to pulses of different voltage values.

Where the common transmission medium employed comprises a pair of conductors that are relatively long, capacitance between the conductors tends to distort the wave shapes of pulses, and such distortion can result in poor signal differentiation. Accordingly, a further object of the invention is to provide a novel pulse-responsive line voltage-reducer which minimizes the distorting effects of line capacitance between such conductors. According to the invention, on the elapse of a given time interval after initiation of a pulse, the voltage-reducer short-circuits the conductors to bring the pulse to an abrupt end.

These and other objects and advantages attained by the invention will become more fully apparent as the description which follows is read in conjunction with the accompanying drawings, wherein.

Figure 1:
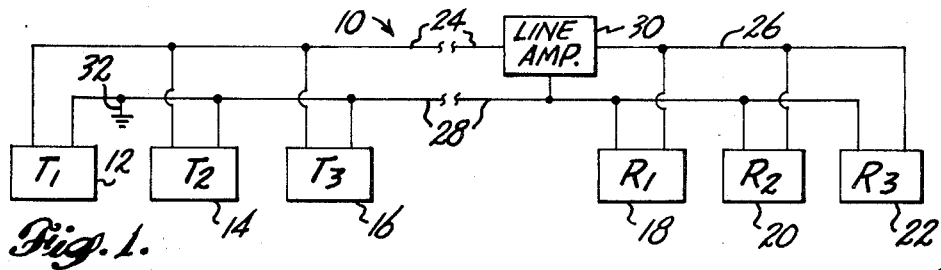
FIG. 1 is a block diagram illustrating a signaling system constructed according to the invention.

Turning now to the drawings, and referring first to FIG. 1 indicated generally at 10 is an electrical signaling system constructed according to the invention. In the embodiment illustrated, the system is employed as a burglar alarm system, and includes transmitters 12, 14, 16, and receivers 18, 20, 22 which are remote from, but associated with, transmitters 12, 14, 16, respectively. The transmitters, normally nonenergized, are energized through the closing of appropriate switches (not shown). In an alarm system, a transmitter might be expected to be placed in operation on being tripped by an intruder. While three transmitters and three receivers are shown, it should be understood that more or fewer may be employed.

The transmitters and receivers are connected together through conductors 24, 26, 28 which together constitute a common transmission medium. Conductors 24, 26 are connected through what is called a line amplifier 30 which is employed to strengthen signals that are transmitter from the transmitters to the receivers. Conductor 28 is grounded at 32.

Transmitters 12, 14, 16 are independently energizable, and when energized, produce recurrent electrical pulses, with the pulses of each transmitter having pulse height characteristics that differ from those of pulses produced by the other transmitters.

Figure 2:
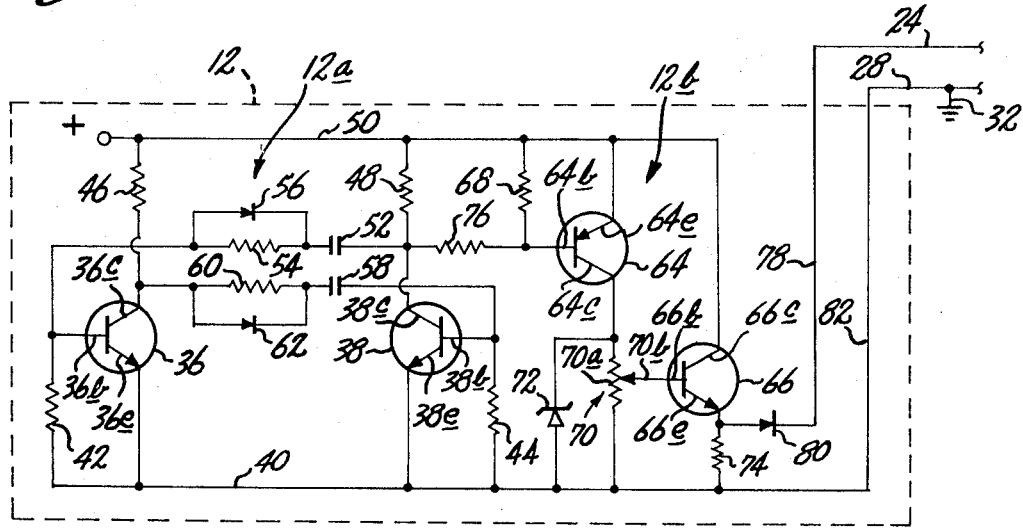
FIG. 2 is a circuit diagram illustrating a transmitter employed in the system of FIG. 1.

Considering transmitter 12 which is illustrated in FIG. 2, it comprises a free-running multivibrator 12a, and a pulse shaper 12b. The multivibrator includes a pair of transistors 36, 38 including the usual emitters 36e, 38e, bases 36b, 38b, and collectors 36c, 38c, respectively. Emitters 36e, 38e are connected directly to a ground conductor 40, and bases 36b, 38b are connected to conductor 40 through resistors 42, 44, respectively. Collectors 36c, 38c are connected through resistors 46, 48, respectively, to a power supply conductor 50. Conductor 50 is connected through suitable switch means (not shown) to a source of positive voltage (also not shown).

The base of transistor 36 is connected to the collector of transistor 38 through a cross-coupling circuit including a capacitor 52 connected in series with the parallel combination of a resistor 54 and a diode 56. Similarly, the base of transistor 38 is connected to the collector of transistor 36 through a cross-coupling circuit including a capacitor 58 in series with the parallel combination of a resistor 60 and diode 62. With a positive voltage applied to conductor 50, the multivibrator operates to produce recurrent electrical pulses. The frequency of such pulses depends upon the resistance values of resistors 46, 48, 54, 60, and upon the capacitance values of capacitors 52, 58.

Pulse shaper 12b includes a pair of transistors 64, 66 having emitters 64e, 66e, bases 64b, 66b, and collectors 64c, 66c respectively. Emitter 64e is connected directly to supply conductor 50, and base 64b is connected to conductor 50 through a resistor 68. Collector 64c is connected to ground conductor 40 through a parallel circuit including winding 70a of a variable resistor 70, and a Zener diode 72.

Transistor 66 has its collector connected directly to supply conductor 50, and its base connected to wiper 70b of resistor 70. Emitter 66e is connected to conductor 40 through a resistor 74.

The multivibrator and pulse shaper are coupled together through a resistor 76 which is connected to collector 38c and to base 64b. With the multivibrator operating, transistor 64 conducts periodically, and causes a positive voltage to be applied through resistor 70 to the base of transistor 66, The magnitude of this voltage is adjusted through positioning of wiper 70b on winding 70a, and the voltage is regulated because of the connection of Zener diode 72 across winding 70a. Upon such a voltage being applied to base 66b, transistor 66 conducts and produces a positive voltage pulse across resistor 74.

Pulses across resistor 74 are fed tp conductors 24, 28 through a conductor 78 and a diode 80 which are connected in series between conductor 24 and emitter 66e, and a conductor 82 which interconnects conductors 28, 40. Diode 80 prevents pulses produced by transmitters 14, 16 from interfering with the operation of transmitter 12.

Considering for a moment the pulses produced by transmitter 12, the height, or maximum voltage level, of such pulses depends upon the position of wiper 70b on winding 70a. The duration of each pulse depends upon the components used in multivibrator 12a. According to the invention, the multivibrator is so designed, and resistor 70 so adjusted, that each output pulse of transmitter 12 (those produced across resistor 74) has, for a certain minimum time interval, or duration, a voltage level exceeding a predetermined voltage value for the transmitter. Although the predetermined voltage value and the length of the time interval are matters of choice, a typical voltage level might be (1) volt, and a typical time interval, eight one-hundredths of a second. A typical frequency for such pulses might be 20 pulses per minute.

Transmitters 14, 16 are similar in construction and operation to transmitter 12, and are connected in a similar manner to conductors 24, 28. Transmitters 14, 16 thus include multivibrators corresponding to multivibrator 12a, and pulse shapers corresponding to pulse shaper 12b including variable resistors corresponding to variable resistor 70.

Considering the pulses produced by transmitters 14, 16, these have frequencies which differ from one another and which also differ from that of pulses produced by transmitter 12. Transmitter 14 produces pulses each of which has a voltage level exceeding a predetermined voltage value for transmitter 14. Through adjustment of the variable resistor in the transmitter's pulse shaper, this voltage value is set to exceed the predetermined voltage value of transmitter 12 by a certain amount, which might be thought of as a preestablished voltage difference.

Similarly, transmitter 16 produces pulses each having a predetermined value for the transmitter. Through adjustment of the variable resistor in the pulse shaper of transmitter 16, this predetermined value is set to exceed that set for transmitter 14 by substantially the same difference as that discussed above in connection with transmitters 12, 14. A typical voltage difference would be about three-tenths of a volt.

Figure 3:
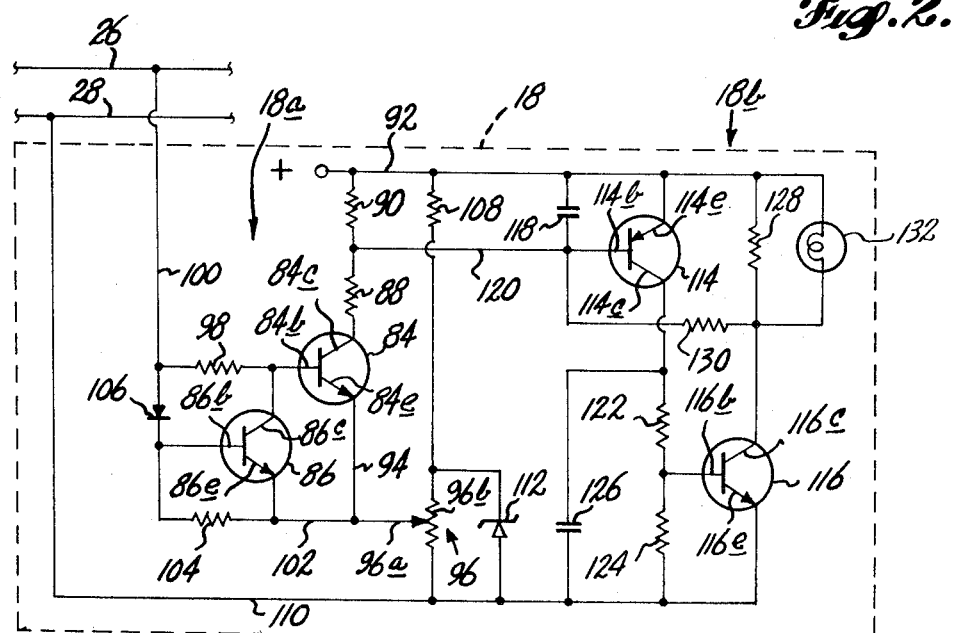
FIG. 3 is a circuit diagram illustrating a receiver also employed in the system of FIG. 1, associated with the transmitter of FIG. 2.

Turning now to the receivers, and considering particularly receiver 18 which is illustrated in FIG. 3, this receiver is associated with and adapted to receive signals produced by transmitter 12. In general terms, receiver 18 includes an input circuit 18a and an output circuit 18b connected in cascade with the input circuit.

The input circuit includes a pair of transistors 84, 86, including emitters 84e, 86e, bases 84b, 86b, and collectors 84c, 86c, respectively. Transistors 84, 86 are substantially the same in construction, and constitute first and second electronic switching devices herein. Bases 84b, 86b constitute input electrodes for the transistors. Collector 84c is connected through a pair of resistors 88, 90 to a power supply conductor 92, which, in turn, is suitably connected to a source of positive voltage (not shown). Base 84e is connected by a conductor 94 to the wiper 96a of a variable resistor, or adjustable agency, 96. Emitter 84b is connected through a resistor 98 and a conductor 100 to previously-mentioned conductor 26. Transistor 84 and resistor 98 together comprise first voltage-sensitive circuit means herein.

Transistor 86 has its collector connected directly to base 84b, and its emitter connected through a conductor 102 to wiper 96a. Base 86b is connected through a resistor 104 to emitter 86e. The base is further connected to the junction between resistor 98 and conductor 100 through a diode, or voltage-drop agency, 106. Transistor 86 and resistor 104 together comprise second voltage-sensitive circuit means herein. The junction between resistor 98, conductor 100 and diode 106 constitutes an input terminal for the receiver.

Winding 96b of resistor 96 has one end connected through a resistor 108 to supply conductor 92, and has its other end connected directly to a ground conductor 110 which is connected to previously mentioned conductor 28. A Zener diode 112 is connected across winding 96b to produce voltage regulation across the winding.

Considering the operation of input circuit 18a, it will be noted that emitters 84e, 86e are connected together through conductor 102, and thus are always at the same electrical potential. This potential is determined by the position of wiper 96a on winding 96b. Hence, and since the two transistors are alike, with the transistors each in a nonconducting state, substantially the same voltage is required at the base of each transistor to cause it to switch to a conducting state.

With a given positive bias voltage applied through wiper 96a to the emitters, a positive input voltage just slightly greater in magnitude than this bias voltage applied to the input terminal for the receiver (the junction between resistor 98, conductor 100 and diode 106) will cause transistor 84 to conduct. Such an input voltage, however, will not be sufficiently high to cause transistor 86 to conduct. This is because of the presence of diode 106 which introduces a substantially fixed voltage drop between the input terminal and base 86b maintaining this base always at a lower electrical potential than base 84b. In order for transistor 86 to conduct, a positive voltage must be applied to the receiver's input terminal which exceeds that required there to cause transistor 84 to conduct by an amount equaling the voltage drop introduced by diode 106. According to the invention, diode 106 is chosen to provide a voltage drop which equals what was referred to earlier as the preestablished voltage difference between the predetermined voltage values for pulses of transmitters 12, 14.

Thus, the setting of wiper 96a on winding 96b, through determining the bias voltages for emitters 84e, 86e, also determines the minimum input voltage required at the receiver's input terminal to cause conduction of transistor 84. Diode 106 determines how much more voltage is required at the input terminal to cause transistor 86 to conduct. With an input voltage which is greater than this minimum voltage, but less than that necessary to cause conduction of transistor 86, transistor 84 alone conducts and produces at its collector a response, or signal, which is continuous for so long as transistor 84 continues to conduct. When the input voltage is sufficient to cause transistor 86 to conduct, this transistor short-circuits emitter 84e and base 84b, and causes transistor 84 to cease conducting, with termination of the above-mentioned response.

In the system disclosed, wiper 96a is adjusted to supply such a bias voltage to emitters 84e, 86e, that transistor 84 conducts on the voltage at the receiver's input terminal exceeding the predetermined voltage value for pulses of transmitter 12.

Output circuit 18b includes a pair of transistors 114, 116, including emitters 114e, 116e, bases 114b, 116b, and collectors 114c, 116c, respectively.

Transistor 114 has its emitter connected directly to supply conductor 92, and its base connected to the supply conductor through a capacitor 118. The base of the transistor is further connected by a conductor 120 to the junction between previously mentioned resistors 88, 90. Collector 114c is connected to ground conductor 110 through the parallel combination of a pair of series resistors 122, 124, and a capacitor 126 connected across the resistors.

Transistor 116 has its emitter connected directly to conductor 110, its base connected to the junction between resistors 122, 124, and its collector connected through a resistor 128 to supply conductor 92. A resistor, or sustaining means, 130 connects collector 116c to base 114b. an indicating lamp 132 is connected across resistor 128.

Considering the operation of the output circuit, transistors 114, 116 are normally nonconductive. Whenever transistor 84 in the input circuit conducts to produce a signal at its collector, this signal is supplied to the base of transistor 114 through resistor 88 and conductor 120. Because of capacitor 118, which charges upon the application of such a signal to base 114b, the voltage at base 114b drops slowly, and transistor 114 conducts only after an appreciable time interval after initiation of the signal. The time interval required for the base voltage to rise sufficiently to cause conduction of the transistor is determined principally by capacitor 118 and resistor 88. The resistor and capacitor are so chosen that this time interval, called the preselected time interval for the receiver, is somewhat less than what was referred to earlier as the preselected time interval for pulses produced by transmitter 12. Typically, this time interval may be about two one-hundredths of a second.

Upon a signal, also called an operating voltage herein, which is continuous for this time interval being applied to base 114b, transistor 114 conducts causing a positive voltage to be applied to the base of transistor 116. When this happens, transistor 116 conducts, and applies a voltage through resistor 130 to the base of transistor 114 which tends to maintain transistor 114 in a conducting state. Thus, the two transistors become locked in conducting states. Also, with conduction of transistor 116, an output voltage, referred to herein also as a responsive output signal for the receiver, appears across resistor 128 and causes lamp 132 to light.

Receivers 20, 22 are substantially the same in construction and operation as receiver 18, and are similarly connected to conductors 26, 28. The input circuit of receiver 20 is constructed to produce a continuous output signal (similar to that produced by input circuit 18a) whenever the voltage at the receiver's input terminal exceeds the predetermined voltage value for pulses of transmitter 14 by less than a preestablished voltage difference which is the same herein as the voltage difference discussed above in connection with receiver 18. The output circuit for receiver 20 operates similarly to output circuit 18b, and produces a responsive output signal for the receiver only upon the voltage at the receiver's input terminal remaining within the appropriate voltage range for a time interval which is substantially the same as the preselected time interval for receiver 18.

Similarly, receiver 22 is constructed so that it produces a responsive output signal only when the voltage at its input terminal, for a time interval that is substantially the same as the preselected time intervals for receivers 18, 20, exceeds the predetermined voltage value for pulses of transmitter 16 by less than the preestablished voltage difference mentioned above.

Figure 4:
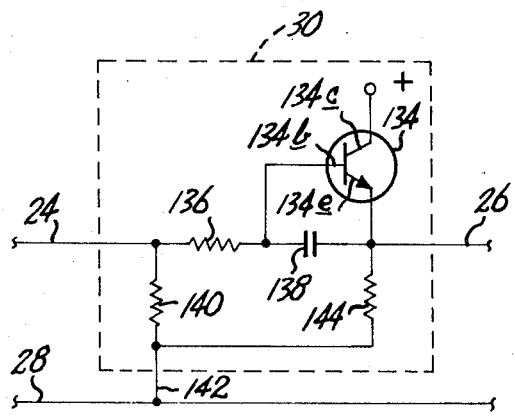
FIG. 4 is a circuit diagram illustrating a line amplifier employed in the system of FIG. 1.

Turning now to FIG. 4 which illustrates line amplifier 30, this amplifier includes a transistor 134 having an emitter 134e, a base 134b and a collector 134c. The emitter is directly connected to previously mentioned conductor 26, and the base is connected through a resistor 136 to previously-mentioned conductor 24. The base and emitter are connected together through a capacitor 138. Collector 134c is connected to a suitable source of positive voltage (not shown). A resistor 140 and a conductor 142 connect conductors 24, 28 together, Additionally, a resistor 144 and conductor 142 connect conductors 26, 28 together.

The line amplifier functions to amplify the current of pulses received on conductors 24, 28, with amplified pulses supplied to conductors 26, 28. While such an amplifier is employed in the preferred embodiment of the invention shown, it is appreciated that there may be applications where a line amplifier is not required.

Explaining now how the system so far described operates as a whole, and assuming that transmitter 14 alone is producing pulses, such pulses are transmitted over conductors 24, 28, amplified by line amplifier 30, and then transmitted over conductors 26, 28.

Because of the adjustments earlier described for the various transmitters and receivers, the voltage level of such pulses falls only within the voltage range to which receiver 20 responds. Hence, only receiver 20 produces a responsive output signal. Receiver 18 does not respond because, although such pulses, for a short time interval, do have voltage levels within the voltage range to which the receiver responds, this time interval is considerably shorter than the preselected time interval established for the receiver. Receiver 22 does not respond because the maximum voltage level of the pulses is below the minimum voltage level to which the receiver responds.

Upon the input circuit of receiver 20 producing a continuous signal for the appropriate time interval, the transistors in the output circuit, because of the connection therebetween made by the resistor corresponding to resistor 130, in receiver 18, become locked in conducting states, and the indicating lamp in the receiver lights. It will be noted that this occurs on the first full appropriate pulse being received by the receiver. The lamp remains lit until these transistors are returned to their nonconductive states, which may be accomplished in any suitable manner, as by momentarily interrupting the supply of operating voltage to the receiver.

Considering the case of transmitter 12 alone producing pulses, such pulses are transmitted in the manner described above for pulses of transmitter 14, and such pulses produce a response only in receiver 18. This is because the maximum voltage level of the pulses of transmitter 12 is less than the minimum voltages to which receivers 20, 22 respond.

With transmitter 16 alone producing pulses, only receiver 22 responds. This is because these pulses, although having the highest maximum voltage level of any pulses in the system, do not have a portion which, for the preselected time interval for the receivers, remains within the voltage ranges to which receivers 18, 20 respond.

With two or more of the transmitters producing pulses, the appropriate receivers respond in much the same manner as that described above where only a single transmitter is operating. One difference in operation, however, occurs where pulses from different transmitters overlap in time. When such an overlap occurs, only the highest voltage pulse of those which overlap produces a response in a receiver. The reason for this is that the highest voltage pulse is the only one that holds the voltage across conductors 26, 28 at its (the pulse's) particular predetermined voltage value for the full time interval necessary to produce a response in a receiver. Because each transmitter has a different pulse frequency, overlaps do not occur frequently, and thus do not pose a problem.

Figure 5:
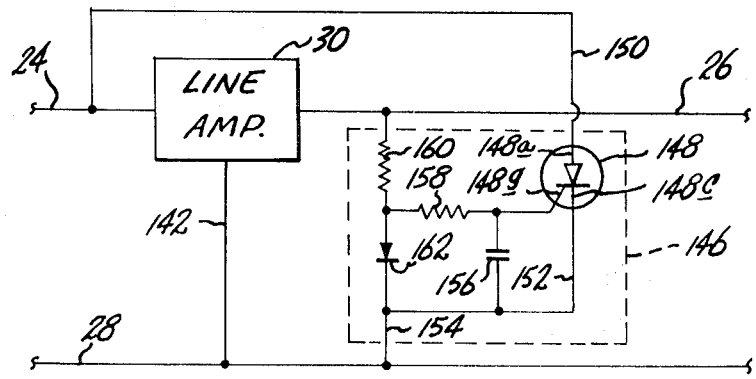
FIG. 5 is a circuit diagram illustrating a line voltage-reducer which is employed in a modified form of signaling system constructed according to the invention.

Turning now to FIG. 5, at 146 is a line short circuiter, or voltage-reducer, which is employed in a modified form of the invention closely adjacent the receivers in the system. The short circuiter has particular utility where conductors 24, 28 are relatively long, and it functions to minimize pulse distortion due to capacitance appearing between the conductors. Short circuiter 146 includes a silicon-controlled rectifier 148 having an anode 148a, a cathode 148c and a cathode gate 148g. Anode 148a is connected to conductor 24 by a conductor 150. Cathode 148c is connected to conductor 28 through a pair of conductors 152, 154. The cathode and cathode gate are connected together through a capacitor 156, and the cathode gate is further connected through a pair of resistors 158, 160 to conductor 26. At 162 is a diode connected between the junction of resistors 158, 160 and the junction of conductors 152, 154.

Considering how the short circuiter operates, initially it has what may be thought of as a "ready" state, with rectifier 148 not conducting. Upon a pulse causing the voltage on conductor 26 to become positive relative to that on conductor 28, current flows between the conductors through resistors 160, 158, capacitor 156, and conductors 152, 154. This causes capacitor 156 to charge, with the voltage across it increasing. After a given time interval, which depends upon the capacitance of capacitor 156 and upon the combined resistance of resistors 158, 160, the voltage across the capacitor becomes sufficiently high to cause receiver 148 to conduct. According to the invention, this interval is chosen to be shorter than the duration of a pulse produced by any of the transmitters, but longer than the preselected time interval set for any of the receivers. A typical interval might be three one-hundredths of a second.

Upon conduction of diode 48, current flows between conductors 24, 28 through conductor 150, diode 148 and conductors 152, 154. This produces a short circuit between conductors 24, 28 and reduces the voltage difference therebetween nearly to zero. IN the usual fashion for a silicon-controlled rectifier, rectifier 148 continues to conduct so long as the current flow through it remains above a certain minimum level. In the present system, a rectifier is chosen which continues to conduct so long as the voltage difference between conductors 24, 28 tends to exceed the lowest predetermined voltage value for any pulse in the system. When the voltage drops below this value, the short-circuiter is again placed in its "ready" state.

During conduction of rectifier 148, capacitor 156 discharges through the circuit including resistor 158, diode 162 and conductor 152.

The short circuiter thus insures that each pulse transmitted over conductors 24, 28 ends abruptly with a rapid drop in voltage across the conductors. This prevents any capacitance appearing between conductors 24, 28 from causing the voltage difference between the conductors to decrease so slowly at the end of a pulse, that while decreasing, it produces a response in a receiver other than the one intended to receive the pulse.

While a short circuiter has been shown herein, it will be apparent to those skilled in the art that other circuits are possible which function to reduce the voltage between conductors 24, 28 to substantially zero.

Thus, and to summarize, the invention provides a novel common medium signaling system wherein signals from different transmitters are transmitted as pulses having different pulse height characteristics, and are distinguished by receivers according to such characteristics. To accomplish this, each receiver includes novel input and output circuits (such as circuits 18a, 18b respectively, in receiver 18) which permit it to respond only to signals produced by the receiver's associated transmitter. And such circuits, as will be apparent from the description above, are relatively simple and inexpensive in construction.

By adjusting the variable resistor (such as resistor 96) provided in a receiver, the pulse height characteristics to which it responds may easily be varied. Thus, manufacture of a set of receivers for a system is greatly simplified, and the receivers are readily interchangeable.

Through selection of the diode (such as diode 106) used in a receiver's input circuit, the range of voltages to which the receiver responds can readily be varied.

While an embodiment of the invention has been described herein, it is appreciated that variations and modifications are possible therein without departing from the spirit of the invention. For example, the pulses produced by transmitters could be negative instead of positive; and further, a system constructed according to the invention could utilize both negative and positive pulses. Further, with the signal sustaining resistors (such as resistor 130 in receiver 18) removed from the output circuits of receivers, the system could be operated in somewhat the reverse fashion from that described above, with the transmitters normally producing pulses, and being turned off to produce a response in a receiver.

I claim:

1. A shared-transmission-medium signaling system comprising:

plural transmitters each operable to produce recurrent electrical pulses having a certain duration, with the pulses of different transmitters having heights within different respective ranges, plural receivers each associated with a different one of said transmitters, each receiver having an input circuit which produces an operating voltage only in response to a pulse having a height within the range characteristic of pulses produced by the receiver's associated transmitter, said input circuit being constructed to sustain such an operating voltage only so long as the height of a received pulse remains within said range, and an output circuit connected in cascade with said input circuit and including sustaining means which produces a sustained output signal for the receiver only on the output circuit being supplied a sustained operating voltage from said input circuit which lasts over a preselected time interval related to the certain duration of pulses produced by the receiver's associated transmitter, and a common transmission medium operatively interconnecting and shared by all of said transmitters and receivers.

2. The signaling system of claim 1, wherein the input circuit for each receiver includes first and second voltage-sensitive circuit means operatively connected to one another, said first circuit means being operable, on the voltage level of a received pulse exceeding a predetermined value, which value is directly related to the pulse height characteristic of the pulses produced by the reciever's associated transmitter, to produce an electrical response, said second circuit means being operable, on the voltage level of a received pulse exceeding said predetermined value by a a certain amount to produce a nullifying counterresponse.

3. The signaling system of claim 2, wherein each receiver further includes an adjustable agency operatively connected to the receiver's first circuit means for establishing the predetermined voltage value for the pulses causing response of the first circuit means for the receiver.

4. The signaling system of claim 2, wherein the response produced by a receiver's first circuit means comprises a signal which is continuous for so long a time as the voltage level of a received pulse exceeds said predetermined value by less than said certain amount.

5. The signaling system of claim 4, wherein, considering each transmitter and its associated receiver, the certain duration of a pulse produced by the transmitter is at least equal to the preselected time interval mentioned for the receiver.

6. The signaling system of claim 4, wherein, considering each transmitter and its associated receiver, the certain duration of a pulse produced by the transmitter is greater than the preselected time interval of the associated receiver, and the time interval associated with operation of said line voltage-reducer is shorter than the duration of the pulse produced by any transmitter and longer than the preselected time interval of any receiver.

7. The signaling system of claim 4, wherein said common transmission medium comprises a pair of conductors, and there is a line voltage-reducer operatively connected to said conductors responsive to a voltage difference between the conductors and operable to short-circuit the conductors to produce rapid decay of a voltage therebetween.

8. The signaling system of claim 5, wherein said common transmission medium comprises a pair of conductors, and there is a line voltage-reducer operatively connected to said conductors responsive to a voltage difference between the conductors and operable, on such being sustained for a time interval, to short-circuit the conductors.

9. The signaling system of claim 8, wherein the voltage difference which the voltage-reducer responds to has a value less than the predetermined voltage value of any receiver.

10. A pulse receiver for distinguishing and responding only to pulses having prechosen pulse height characteristics comprising:

an input terminal for receiving pulses, first circuit means operatively connected to said input terminal operable, on the voltage level of a received pulse exceeding a predetermined value, to produce a response which is continuous for so long a time as the voltage level of a received pulse exceeds said predetermined value by less than a certain amount, second circuit means operatively connected to said first circuit means operable, on the voltage level of a received pulse exceeding said predetermined value by said certain amount to inhibit production by said first circuit means of such a response, and an output circuit operatively connected to said first circuit means which, on receiving a continuous signal for a time equaling a preselected time interval, produces a responsive output signal for the receiver.

11. The receiver of claim 10 which further comprises an adjustable agency operatively connected to said first circuit means adjustable to establish the predetermined voltage value for the pulses causing response of the first circuit means of said receiver.

12. The receiver of claim 10, wherein said first circuit means comprises a first electronic switching device having conducting and nonconducting states, said device being switched to its said conducting state on the voltage level of a received pulse exceeding said predetermined voltage value, and said second circuit means comprises a second electronic switching device also having conducting and nonconducting states operable, when switched to its said conducting state and with said first device in its said conducting state, to cause said first device to switch to its said nonconducting state, said second device being switched to its said conducting state on the voltage of a received pulse exceeding said predetermined voltage value by said certain amount.

13. The receiver of claim 12, wherein said first and second electronic switching devices each include an input electrode operatively connected to said receiver's said input terminal, with the input electrode of said second electronic switching device connected to said terminal through a voltage-drop agency which, with the receiver receiving a pulse, tends to maintain a voltage difference between said electrodes equal to said certain amount.

PO-1050
(5/69)

UNITED STATES PATENT OFFICE
CERTIFICATE OF CORRECTION

Patent No. 3,588,828          Dated June 28, 1971

Inventor(s) Joseph Schulein

It is certified that error appears in the above-identified patent and that said Letters Patent are hereby corrected as shown below:

Column 8, line 26, "6." should read -- 7. --; same line 26, "4" should read -- 6 --; line 35, "7." should read -- 6. --.

Signed and sealed this 27th day of February 1973.

(SEAL)
Attest:

EDWARD M.FLETCHER,JR.          ROBERT GOTTSCHALK
Attesting OFFICER          Commissioner of Patents